US008548272B2

(12) United States Patent
Hirai

(10) Patent No.: US 8,548,272 B2
(45) Date of Patent: Oct. 1, 2013

(54) IMAGE SIGNAL PROCESSING APPARATUS, IMAGE SIGNAL PROCESSING METHOD, CAMERA APPARATUS, IMAGE DISPLAY APPARATUS, AND IMAGE SIGNAL OUTPUT APPARATUS

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 1482 days.

(21) Appl. No.: 12/139,150

(22) Filed: Jun. 13, 2008

(65) Prior Publication Data

US 2009/0091636 A1    Apr. 9, 2009

(30) Foreign Application Priority Data

Jun. 15, 2007    (JP) ................. 2007-158432

(51) Int. Cl.
*H04N 5/235*    (2006.01)

(52) U.S. Cl.
USPC ....................................... 382/298

(58) Field of Classification Search
None
See application file for complete search history.

(56) References Cited

U.S. PATENT DOCUMENTS

| 5,396,583 | A * | 3/1995 | Chen et al. ............. 345/427 |
| 7,826,658 | B2 * | 11/2010 | Sato et al. ............. 382/165 |
| 2005/0249404 | A1 * | 11/2005 | Xiaomang ............. 382/162 |
| 2006/0146187 | A1 * | 7/2006 | Handjojo et al. ........ 348/448 |
| 2007/0071292 | A1 * | 3/2007 | Rao et al. ............. 382/128 |
| 2007/0276236 | A1 * | 11/2007 | Jong .................... 600/437 |

FOREIGN PATENT DOCUMENTS

| JP | 01-280440 | 11/1989 |
| JP | 04-269936 | 9/1992 |
| JP | 06-078272 | 3/1994 |
| JP | 08-129374 | 5/1996 |
| JP | 10-327339 | 12/1998 |
| JP | 2001-292341 A | 10/2001 |
| JP | 2002-10105 A | 1/2002 |
| JP | 2006-135571 A | 5/2006 |
| JP | 2006-245645 A | 9/2006 |
| JP | 2006-260520 | 9/2006 |
| JP | 2006260520 A * | 9/2006 |
| JP | 2007-041196 | 2/2007 |

* cited by examiner

*Primary Examiner* — Claire X Wang
*Assistant Examiner* — Thomas A James
(74) *Attorney, Agent, or Firm* — Finnegan, Henderson, Farabow, Garrett & Dunner, L.L.P.

(57) ABSTRACT

An image processing apparatus and method for obtaining an image signal to be processed. A classification information obtaining section obtains classification information indicating the image signal as one of a plurality of image signal types. The plurality of image signal types include a first type comprising a plurality of frames extracted from a large still image, the frames being extracted by moving an extracting area in units of an integer pixel per frame over the large still image, extracting the frames corresponding to the extraction area, and outputting an image signal corresponding to the frames. An image signal processing section then performs processing on the image signal based on the classification information.

11 Claims, 10 Drawing Sheets

IMAGE SIGNAL PROCESSING APPARATUS, IMAGE SIGNAL PROCESSING METHOD, CAMERA APPARATUS, IMAGE DISPLAY APPARATUS, AND IMAGE SIGNAL OUTPUT APPARATUS

FIELD OF THE INVENTION

The present disclosure relates generally to an image signal processing apparatus, an image signal processing method, a camera apparatus, an image display apparatus, and an image signal output apparatus. The present invention contains subject matter related to Japanese Patent Application No. 2007-158432, filed in the Japanese Patent Office on Jun. 15, 2007, the entire contents of which being incorporated herein by reference.

BACKGROUND OF THE INVENTION

In the past, various processings are known to be performed on an image signal for a purpose of image quality improvement. For example, the processings include an enhance processing, a noise reduction processing, an aliasing prevention processing, or a motion adaptation interlaced to progressive ("I/P") conversion processing. The enhance processing is a processing for enhancing a high frequency component of the image signal to enhance a contour of an image. The noise reduction processing is a processing for suppressing a noise included in the image signal. The aliasing prevention processing is a processing for removing with a filter, a frequency component which becomes a cause of an aliasing distortion. The I/P conversion processing is a processing for changing an interlace signal to a progressive signal.

In the past, changing of the above-mentioned processings on the image signal in accordance with a type of the image signal is known. For example, Japanese Unexamined Patent Application Publication No. 2006-260520 ("the '520 publication") discloses classifying image signals into two types, a moving image and a still image, and changing the enhance processing depending on whether the image signal is a moving image or a still image. However, among image signals classified as moving images in the past, in addition to an image signal being a moving image from the beginning, there can also be image signal generated by being subjected to a processing for adding a motion to the image signal of the still image.

In this case, as the processing for adding the motion, a movement of a read position at a part of the still image, or a magnification or a reduction, may be performed. In a case where the read position at a part of the still image is moved, a perceived amount of aliasing of the sampling on a screen may vary depending on the case of moving in an integer pixel/frame and other cases.

In some cameras for picking up a still image, the number of pixels may be over 1000 million pixels. In general, a still image camera has a higher resolution than a moving image camera. An image obtained by moving the read position at a part of the still image has a higher resolution than an image obtained from the moving image camera, and the noise may stay at the same position with respect to a subject.

From the above, as described in the '520 publication, with the signal processing only based on classification into the two types including the image signals of the moving image and the still image, in view of securing of the acutance, the perceived amount of the noise, and the perceived amount of the aliasing distortion, an optimal image quality cannot be obtained.

It is accordingly a primary object of the present disclose to perform an image signal processing so that an optimal image quality can be obtained all the time.

SUMMARY OF THE INVENTION

One aspect of the disclosure is directed to an image signal processing apparatus. The image signal processing apparatus may include an image signal obtaining section configured to obtain an image signal to be processed. The image signal processing apparatus may further include a classification information obtaining section configured to obtain classification information indicating the image signal as one of a plurality of image signal types, the plurality of image signal types including a first type comprising a plurality of frames extracted from a large still image, the frames being extracted by moving an extracting area in units of an integer pixel per frame over the large still image, extracting the frames corresponding to the extraction area, and outputting an image signal corresponding to the frames. The image signal processing apparatus may also include an image signal processing section configured to process the image signal based on the classification information.

Another aspect of the disclosure is directed to an image signal processing method. The method may include obtaining an image signal to be processed, and obtaining classification information indicating the image signal as one of a plurality of image signal types, the plurality of image signal types including a first type comprising a plurality of frames extracted from a large still image, the frames being extracted by moving an extracting area in units of an integer pixel per frame over the large still image, extracting the frames corresponding to the extraction area, and outputting an image signal corresponding to the frames. The method may further include processing the image signal based on the classification information.

Yet another aspect of the disclosure is directed to a recording medium storing instructions for causing a computer to execute an image signal processing method. The method may include obtaining an image signal to be processed, and obtaining classification information indicating the image signal as one of a plurality of image signal types, the plurality of image signal types including a first type comprising a plurality of frames extracted from a large still image, the frames being extracted by moving an extracting area in units of an integer pixel per frame over the large still image, extracting the frames corresponding to the extraction area, and outputting an image signal corresponding to the frames. The method may further include processing the image signal based on the classification information.

Yet another aspect of the disclosure is directed to a camera apparatus. The camera apparatus may include an image pickup section configured to pick up an image of a subject by capturing an image of the subject and output an image signal corresponding to the subject. The camera apparatus may further include an image signal obtaining section adapted to obtain the image signal, and a classification information obtaining section configured to obtain classification information indicating the image signal as one of a plurality of image signal types, the plurality of image signal types including a first type comprising a plurality of frames extracted from a large still image, the frames being extracted by moving an extracting area in units of an integer pixel per frame over the large still image, extracting the frames corresponding to the extraction area, and outputting an image signal corresponding to the frames. The camera apparatus may also include an image signal processing section configured to process the image signal based on the classification information.

Yet another aspect of the disclosure is directed to an image signal output apparatus. The image signal output apparatus may include an image signal generation section configured to generate, based on an image signal of a still image having a higher resolution than a resolution in a display area, an image signal which comprises a plurality of frames extracted from the still image by moving an extraction area in units of an integer pixel per frame over the still image in the display area. The image signal output apparatus may further include an image signal processing section configured to process and output the image signal generated in the image signal generation section, wherein the image signal processing section includes an aliasing prevention filter configured to prevent aliasing distortion by setting a frequency band of the aliasing prevention filter higher than ½ of a sampling frequency of a display apparatus.

Still yet another aspect of the disclosure is directed to an image signal output apparatus. The image signal output apparatus may include an image signal generation section configured to generate, based on an image signal of a still image having a higher resolution than a resolution in a display area, an image signal which comprises a plurality of frames extracted from the still image by moving an extraction area in units of an integer pixel per frame over the still image in the display area. The image signal output apparatus may further include an image signal processing section configured to process and output the image signal generated in the image signal generation section, wherein the image signal processing section includes an enhance section configured to enhance a contour by applying a high frequency band in a vicinity of ½ of a sampling frequency of a display apparatus.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Reference will now be made in detail to the present embodiments of the disclosure, examples of which are illustrated in the accompanying drawings. Wherever possible, the same reference numbers will be used throughout the drawings to refer to the same or like parts.

Figure 1:
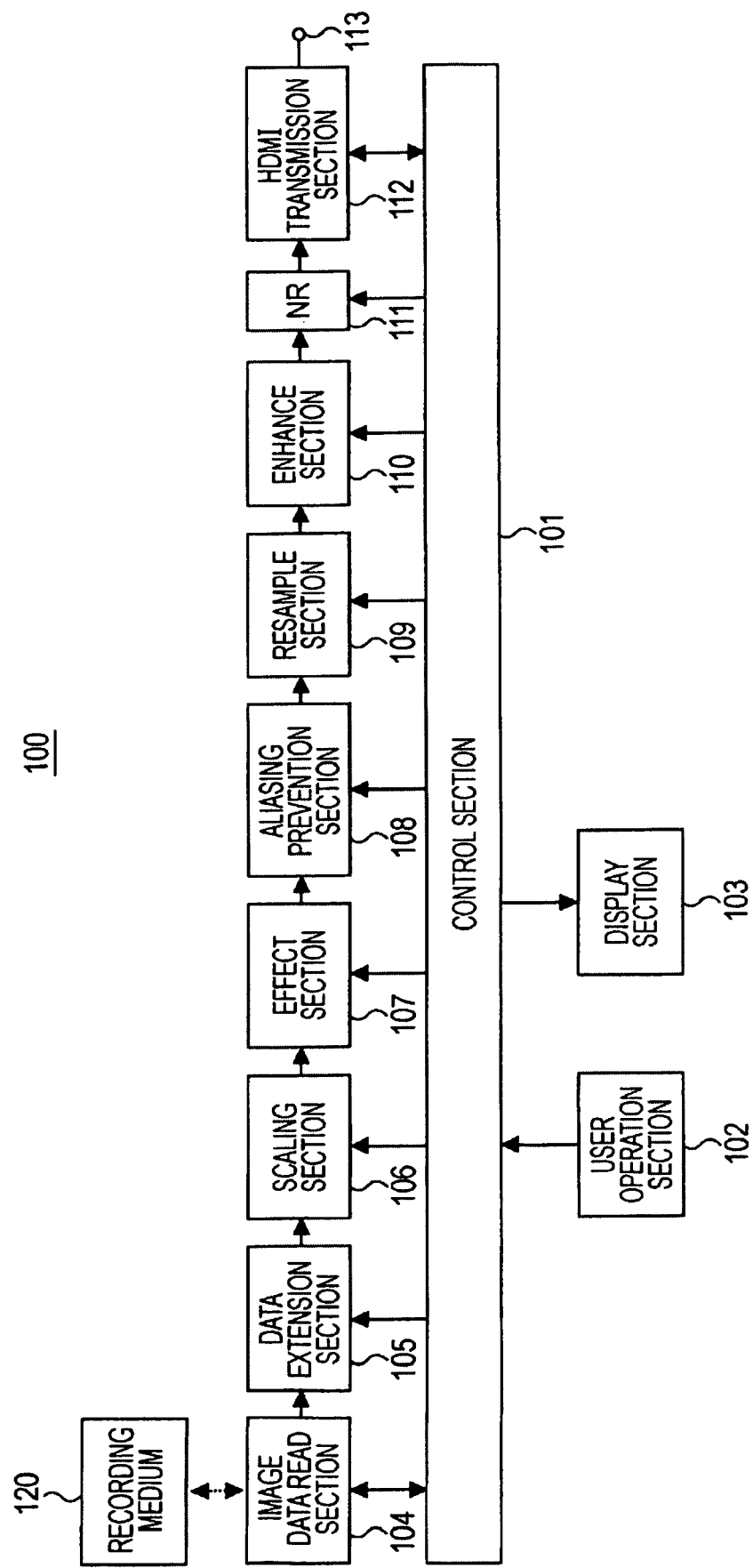
FIG. 1 is a block diagram of a configuration example of an image signal output apparatus.

FIG. 1 illustrates an exemplary configuration of an image display apparatus 100. The image display apparatus 100 may output four types of image signals including a moving image, a completely still image, a still image moved in units of an integer pixel (hereinafter referred to as "first motion added still image"), and a still image having a motion which is not moved in units of an integer pixel (hereinafter referred to as "second motion added still image"). In the image display apparatus 100, as will be described later, processing may be respectively performed on the image signal of the respective type so that an optimal image quality may be obtained. It should be noted that "the completely still image," "the first motion added still image," and "the second motion added still image" may be included in a still image group.

The image signal of "the moving image" may be an image signal which may be obtained through an image pickup using a camera apparatus as a moving, or video, image. In the moving image (video) based on this image signal of "the moving image," the noise does not stay at the same position but moves, and thus may be prominent. In addition, in the moving image based on this image signal of the moving image, the jaggy (blur) near the line due to the aliasing distortion of the sampling does not stay at the same position but moves, and thus is prominent.

Also, the image signal of "the completely still image" may be an image signal obtained through an image pickup with a camera apparatus as a large still image. This image signal of "the completely still image" may be picked up by using an image pickup element in which the number of pixels may be sufficiently larger than 200 million pixels. In addition, even when this image signal of "the completely still image" is interlaced and transmitted, the interlaced to progressive ("I/P") conversion may be ideally performed. In addition, in order to obtain an image quality suitable at the time of printing, contour correction and a noise suppression may be set to a moderate level. In addition, in the still image (stop motion image) based on this image signal of "the completely still image," the noise may stay at the same position, and thus is not prominent. In addition, in the still image based on this image signal of "the completely still image," the jaggy (blur) near the line due to the aliasing distortion of the sampling stays at the same position, and thus is not prominent.

In addition, the image signal of "the first motion added still image" may be generated based on the image signal of the completely still image. For example, the image signal of "the first motion added still image" may be configured of an image signal corresponding to an extraction area of each frame, and when an extraction area is set on the large still image, the extraction area may be moved in units of an integer pixel/frame. The integer pixel may be, for example, 1 pixel or 2 pixels.

In this image signal of "the first motion added still image," the jaggy (blur) near the line due to the aliasing distortion of the sampling is not prominent similarly to the above-mentioned case of "the completely still image." In addition, in the image based on the image signal of "the first motion added still image," the noise is not prominent similarly to the above-mentioned case of "the completely still image." In addition, when an image signal of "the first motion added still image" is interlaced and transmitted, the vertical resolution may be lowered when a motion adaptation I/P conversion section becomes the line interpolation, and in particular, at a part where the aliasing distortion exists, the interpolation and the field interpolation flip-flop.

In addition, the image signal of "the second motion added still image" may also be generated based on the image signal of the completely still image. For example, the image signal of "the second motion added still image" may be configured of an image signal corresponding to a predetermined area of each frame, and when an extraction area is set on the still image, the extraction area may be moved in units of an integer pixel/frame and furthermore a zoom (magnification or reduction) processing may be combined. As the zoom may combine with the parallel movement in the predetermined area, a motion other than the integer pixel unit may be added.

In this image signal of "the second motion added still image," the jaggy (blur) near the line due to the aliasing distortion of the sampling is prominent similarly to the above-mentioned case of the moving image.

The image display apparatus 100 may include a control section 101, a user operation section 102, a display section 103, an image data read section 104, a data extension section 105, a scaling section 106, an effect section 107, an aliasing prevention filter 108, a resample section 109, an enhance section 110, a noise reduction ("NR") section 111, an HDMI transmission section 112, and an output terminal 113. The image display apparatus 100 may be configured, for example, as a personal computer.

The control section 101 may control operations of the respective sections in the image display apparatus 100. The user operation section 102 and the display section 103 may be included in a user interface, and are connected to the control section 101. The user operation section 102 may be configured of a key or a button arranged in a casing which may be not shown of the image display apparatus 100, or a touch panel arranged on a display surface of the display section 103, for example. The display section 103 may be configured of a display element such as a LCD (Liquid Crystal Display) arranged in the casing which may be not shown of the image display apparatus 100.

The image data read section 104 may read an image signal (image file) from a recording medium 120. Exemplary recording media may include, for example, a removable recording medium such as a memory card, an optical disk, a magnetic disk, a hard disk, a floppy disk, or semiconductor memory. The recording medium 120 may record the image signal of the moving image and the image signal of the completely still image. When the recording medium 120 is connected, the image data read section 104 may read file management information from the recording medium 120 to be supplied to the control section 101.

On the basis of the management information, the control section 101 may supply a display signal for displaying a file name of the image file recorded in the recording medium 120 to the display section 103 for displaying the file name on the display section 103. With the user operation section 102, the user may refer to the file name displayed on the display section 103 and may select the image file that should be read in the image data read section 104.

Herein, the recoding of the image signal to the recording medium 120 will be described. For example, the recording medium 120 may record the image signal of the moving image or the image signal of the still image on the basis of a camera apparatus 150 illustrated in FIG. 2. For example, the recording medium 120 may record an image signal for a high resolution panorama image which the camera apparatus 150 may obtain by stitching image signals of a plurality of still images picked by the camera apparatus 150 based on panorama image generation apparatus 160 illustrated in FIG. 3.

A description will be given of the camera apparatus 150 illustrated in FIG. 2. The camera apparatus 150 may include an image pickup section 151, an image pickup signal processing section 152, a data compression section 153, and an image data write section 154. The image pickup section 151 may include an image pickup lens and an image pickup element, which are not shown, which may pick up an image of a subject and output an image pickup signal corresponding to the subject. The image pickup element may be configured of an image pickup element such as a CCD (Charged Coupled Device) or a CMOS (Complementary Metal-Oxide Semiconductor). The image pickup signal processing section 152 may perform sample hold and gain control of the image pickup signal (analog signal) output from the image pickup section 151, conversion from the analog signal to a digital signal, and further, white balance adjustment, gamma correction, and the like to output the image signal.

The data compression section 153 may perform a compression encoding processing on the image signal output from the image pickup signal processing section 152. For example, in a case where the image signal relates to the moving image, a compression encoding based on an MPEG (Moving Picture Expert Group) format may be performed. Also, for example, in a case where the image signal relates to the still image, a compression encoding based on a JPEG (Joint Photographic Experts Group) format may be performed. The image data write section 154 may write the compression encoded image signal (the image signal of the moving image, the image signal of the still image) obtained in the data compression section 153 in the recording medium 120 as the image file.

Figure 2:
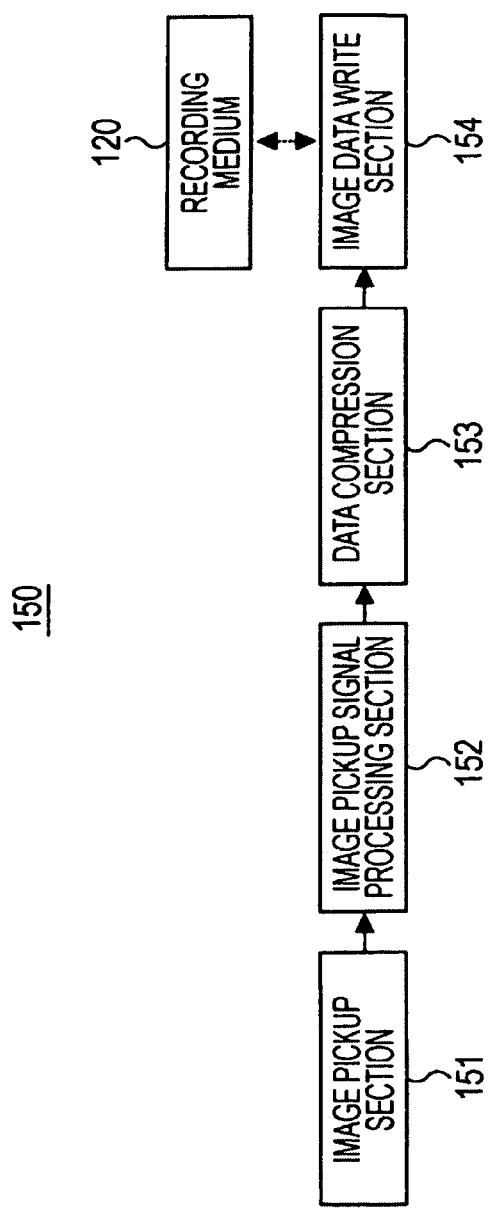
FIG. 2 is a block diagram of a configuration example of a camera apparatus for recording image signals of the moving image and the still image in a recording medium.

An operation of the camera apparatus 150 illustrated in FIG. 2 will be briefly described. The subject may be picked up as the moving image or the still image in the image pickup section 151. The image pickup signal (analog signal) output from the image pickup section 151 may be supplied to the image pickup signal processing section 152. In the image pickup signal processing section 152, an analog signal processing such as sample hold and gain control, A/D conversion, and further, a digital signal processing such as white balance adjustment or gamma correction, and the like may be performed on the image pickup signal to generate the image signal.

This image signal may be supplied to the data compression section 153. In this data compression section 153, compression encoding processing based on the MPEG format or the JPEG format may be performed on the image signal to generate the compression encoded image signal. This image signal may be supplied to the image data write section 154. The image data write section 154 may generate the image file including the image signal. The generated image file may then be written and saved in the recording medium 120 via the image data write section 154.

The panorama image generation apparatus 160 illustrated in FIG. 3 will now be described. The panorama image generation apparatus 160 may include an image data read section 161, a data expansion section 162, a stitching section 163, a data compression section 164, and an image data write section 165. The panorama image generation apparatus 160 may be configured, for example, as a personal computer.

The image data read section 161 may read the image signals of a plurality of still images (the image files) that configure the panorama image from the recording medium 120. The panorama image may be obtained by stitching a plurality of still images in a horizontal direction (horizontally long panorama image) or by stitching a plurality of still images in a vertical direction (vertically long panorama image).

The data expansion section 162 may decode the image signals of the plurality of still images read from the image data read section 161. The stitching section 163 may stitch the image signals of the plurality of still images obtained by being decoded in the data expansion section 162 to generate the image signal for the high resolution panorama image.

The data compression section 164 may perform, for example, compression encoding processing based on the JPEG format on the image signal for the high resolution panorama image generated in the stitching section 163. The image data write section 165 may write the compression encoded image signal obtained in the data compression section 164 in the recording medium 120 as the image file of the still image.

Figure 3:
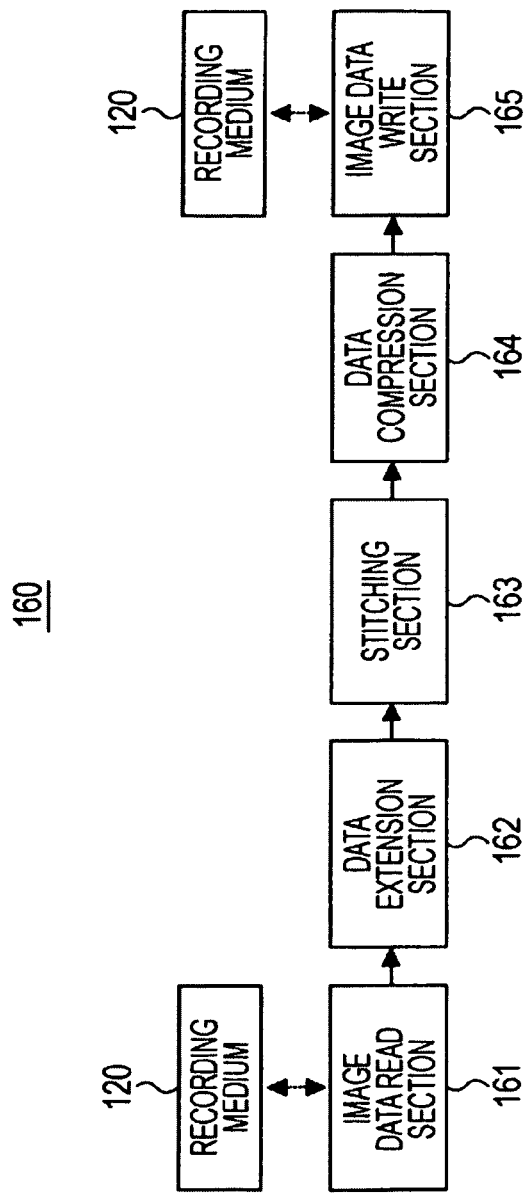
FIG. 3 is a block diagram of a configuration example of a panorama image generation apparatus for generating an image signal for a high resolution panorama image by stitching the image signals of a plurality of still images picked up by the camera apparatus.

An operation of the panorama image generation apparatus 160 illustrated in FIG. 3 will be briefly described. From the recording medium 120, the image data read section 161 may read the image signals of the plurality of still images (the image files) that should configure the panorama image. The image signals of the plurality of still images may be decoded in the data expansion section 162 and thereafter supplied to the stitching section 163. In the stitching section 163, the image signals of the plurality of still images may be stitched, and the image signal for the high resolution panorama image (the image signal of the still image) may be generated.

The image signal for the panorama image generated in the stitching section 163 may be supplied to the data compression section 164. In the data compression section 164, the compression encoding processing based on the JPEG format may be performed on the image signal to generate the compression encoded image signal. This image signal may be supplied to the image data write section 165. In the image data write section 165, the image file including the image signal for the panorama image may be generated. Then, through the image data write section 165, the generated image file may be written and saved in the recording medium 120.

Returning to FIG. 1, the data extension section 105 may perform the decoding processing on the image signal read in the image data read section 104. In this case, when the read image signal is the image signal of the moving image encoded on the basis of the MPEG format, the decoding processing based on the MPEG format may be performed. In addition, when the read image signal is the image signal of the still image encoded on the basis of the JPEG format, the decoding processing based on the JPEG format may be performed.

The scaling section 106 performs the image magnification reduction processing (zoom processing) on the image signal obtained by being decoded in the data extension section 105 under the control of the control section 101 if necessary. For example, when the user selects the outputting of the image signal of "the second motion added still image" described above from the user operation section 102, in order to generate the image signal, the zoom processing may be performed in the scaling section 106.

It should be noted that when outputting the image signal of "the second motion added still image" and when outputting the image signal of "the first motion added still image" as described, the image signal of the high resolution still image (the image file) such as the above-mentioned image signal for the panorama image may be read from the recording medium 120.

The effect section 107 may perform processing on the image signal on which the zoom processing is performed in the scaling section 106, or the image signal may be decoded in the data extension section 105 and pass through the scaling section 106 as is. The effect section 107 may perform the following processing, for example, when the user selects outputting of the image signal of "the first motion added still image" or "the second motion added still image" described above from the user operation section 102.

That is, the effect section 107 may set an extraction area corresponding, for example, to the display area on the high resolution still image on the panorama image, may move the extraction area in units of the integer pixel/frame, and may extract and output the image signal corresponding to the extraction area in each frame. For example, the integer pixel may be selected so that the movement of the image based on the image signal of "the first motion added still image" or "the second motion added still image" becomes smooth, and may be, for example, 1 pixel or 2 pixels.

Figure 4A:
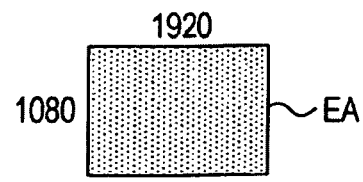
FIGS. 4A-4C are drawings for describing a processing example of an effects section when an image signal of "first motion added the still image" or "the second motion added still image" may be generated.
Figure 4B:
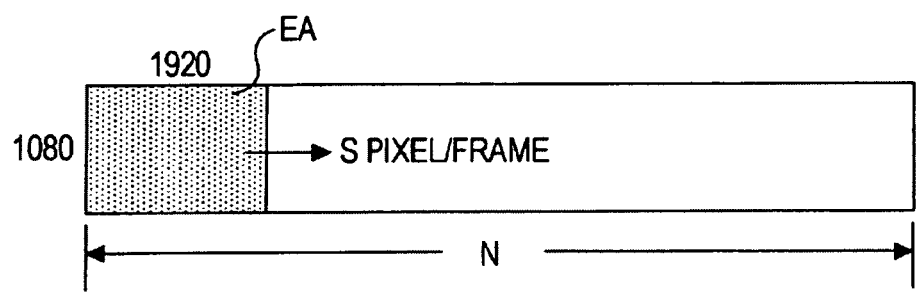
Figure 4C:
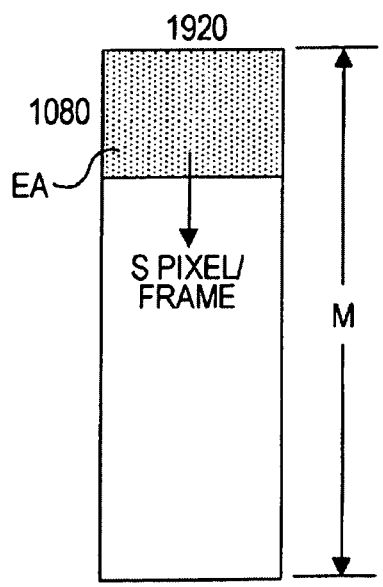

The processing example in the effect section 107 may be further described with use of FIGS. 4A-4C. FIG. 4A illustrates an example of an extraction area EA. The extraction area EA may correspond to a display area of Full HD resolution (1920×1080 pixels).

FIG. 4B illustrates a still image at a high resolution in which the vertical direction has 1080 pixels and the horizontal direction has N pixels (N>1920). For example, in the effect section 107, as illustrated in FIG. 4B, the extraction area EA may be set on the still image, the extraction area EA may be moved in the horizontal direction at a speed of S pixels/frames, and the image signal corresponding to the extraction area EA in each frame may be taken out to obtain the output image signal.

FIG. 4C illustrates a still image at a high resolution in which the horizontal direction may have 1920 pixels and the vertical direction may have M pixels (M>1080). For example, in the effect section 107, as illustrated in FIG. 4C, the extraction area EA may be set on the still image, the extraction area EA may be moved in the vertical direction at a speed of S pixels/frames, and the image signal corresponding to the extraction area EA in each frame may be taken out to obtain the output image signal.

The image data read section 104, the data extension section 105, the scaling section 106 and the effect section 107 described above configure an image signal obtaining section. The image signal obtaining section, based on a selection operation by the user, may selectively obtain one of four types of image signals including "the moving image," "the completely still image," "the first motion added still image," and "the second motion added still image."

The control section 101 may control, on the basis of the user selection from the user operation section 102, the image signal (the image file) that should be read from the recording medium 120, and may also control the operations of the scaling section 106 and the effect section 107 so that the above-mentioned image signal obtaining section obtains the image signal of "the moving image," "the completely still image," "the first motion added still image" or "the second motion added still image." For that reason, the control section 101 may obtain classification information indicating whether an image signal $S_{po}$ obtained in the image signal obtaining section (output from the effect section 107) may be one of the four types including "the moving image," "the completely still image," "the first motion added still image," and "the second motion added still image." In this sense, the control section 101 may be included in a classification information obtaining section. An image signal processing section which will be described later may process the image signal $S_{po}$ output from the effect section 107 under the control of the control section 101 based on the classification information.

Returning to FIG. 1, in order to prevent the aliasing distortion due to the sampling, the aliasing prevention filter 108 may perform a band limitation on the image signal $S_{po}$ output from the effect section 107 (the image signal on which the processing may be performed in the effect section 107, or the image signal decoded in the data extension section 105 which may pass through the scaling section 106 and the effect section 107 as is).

As described above, in the image based on the image signal of "the moving image" or the image signal of "the second motion added still image," the aliasing distortion is prominent, but in the image based on the image signal of "the completely still image" or "the first motion added still image," the aliasing distortion is not prominent. For that reason, a cutoff frequency of the aliasing prevention filter 108 may be controlled in the following manner under the control of the control section 101.

Figure 5:
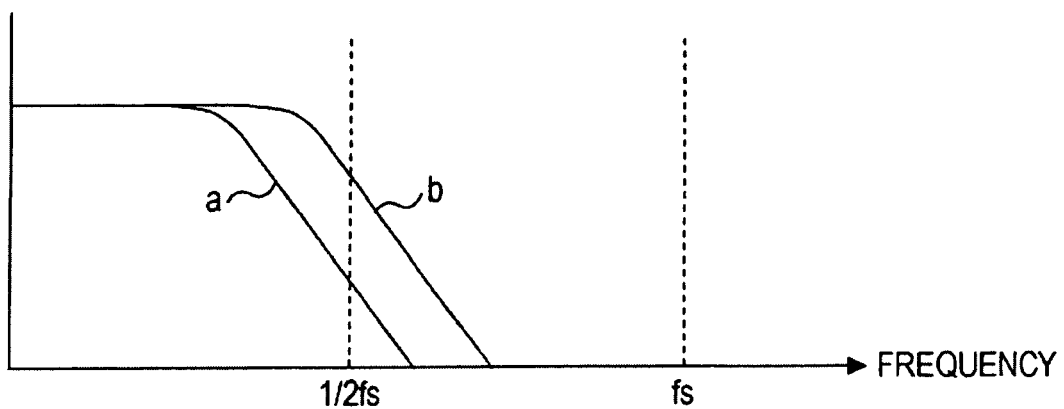
FIG. 5 is a drawing for describing a characteristic of an aliasing prevention filter.

That is, in a case where the image signal $S_{po}$ is the image signal of "the moving image" or the image signal of "the second motion added still image," the cutoff frequency of the aliasing prevention filter 108 may be set to ½ of the sampling frequency as illustrated in curve "a" of FIG. 5. In addition, in a case where the image signal $S_{po}$ is the image signal of "the completely still image" or the image signal of "the first motion added still image," the cutoff frequency of the aliasing prevention filter 108 may be set higher than ½ of the sampling frequency as illustrated in curve "b" of FIG. 5, and the decrease in resolution may be suppressed. It should be noted that the sampling frequency "fs" of FIG. 5 may be a sampling frequency in the display apparatus (display).

In this manner, in a case where the image signal $S_{po}$ is the image signal of the image signal of "the completely still image" and "the first motion added still image," by setting the cutoff frequency of the aliasing prevention filter 108 higher, attenuation in the pass band may be smaller and a frequency component higher than fs/2 can be kept, and the decrease in resolution due to the band limitation may be suppressed. Even with a smaller order filter, the attenuation in the pass band may be suppressed.

The resample section 109 may perform a resample processing on the image signal output from the aliasing prevention filter 108 for matching the number of pixels of the image signal with the number of pixels of the display apparatus (display). For example, when the display apparatus (display) has the display area of Full HD resolution (1920×1080 pixels), resampling may be performed so that data of each pixel in the display area can be obtained. It should be noted that in a case where the above-mentioned effect section 107 already performs the processing in the extraction area matched with the display area, the resample processing in the resample section 109 may be unnecessary.

The enhance section 110 may perform processing for enhancing the contour of the image on the image signal output from the resample section 109. As described above, in the case of the image signal of "the moving image," the band is narrow and further the moving noise is large and the noise is prominent, but in the case of the image signal of the still image group ("the completely still image," "the first motion added still image," or "the second motion added still image"), the band is large, and further the moving noise is small and the noise is not prominent. For that reason, a enhance characteristic of the enhance section 110 may be controlled in the following manner under the control of the control section 101.

Figure 6:
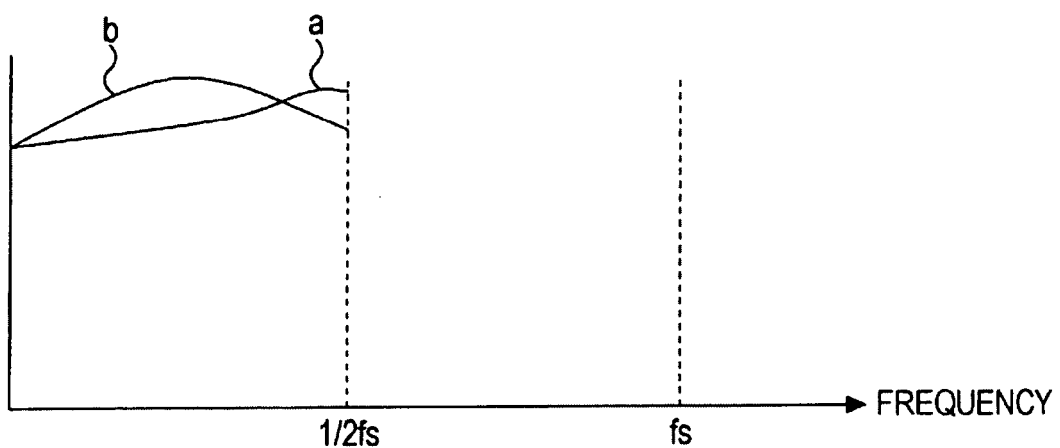
FIG. 6 is a drawing for describing an enhance characteristic.

In a case where the image signal $S_{po}$ is the image signal of the still image group, the enhance characteristic of the enhance section 110 may enhance a high frequency band in a vicinity of fs/2 as illustrated in the curve "a" of FIG. 6. In addition, in a case where the image signal $S_{po}$ is the image signal of "the moving image," the enhance characteristic of the enhance section 110 may enhance a lower frequency band as compared with the case of the image signal of the still image group as illustrated in the curve "b" of FIG. 6.

In this manner, in a case where the image signal $S_{po}$ is the image signal of the still image group, the enhance section 110 may enhance the high frequency band in a vicinity of fs/2, but as the band of the image signal is wide and further the moving noise on the image based on the signal is small, the fineness may be increased without causing the noise to be more prominent.

The NR (noise reduction) section 111 may reduce the noise of the image signal output from the enhance section 110. The NR section 111 may be configured of a three dimensional noise reduction circuit or a two dimensional noise reduction circuit known in the past. The NR section 111 may be controlled in the following manner under the control of the control section 101.

In a case where the NR section 111 is configured of the three dimensional noise reduction circuit, when the image signal $S_{po}$ is the image signal of "the moving image," as the noise of the image is prominent in each frame as described above, noise reduction processing based on the three dimensional noise reduction circuit may be performed, but when the image signal $S_{po}$ is the image signal of the still image group, as the noise of the image is not prominent as described above, in order to prevent the decrease in the resolution, noise reduction processing based on the three dimensional noise reduction circuit is not performed.

In addition, in a case where the NR section 111 is configured of the two dimensional noise reduction circuit, when the image signal $S_{po}$ is the image signal of "the moving image," as the noise of the image is prominent as described above, the noise reduction processing based on the two dimensional noise reduction circuit may not be performed, but when the image signal $S_{po}$ is the image signal of the still image group, as the noise of the image is not prominent as described above, the noise reduction processing based on the two dimensional noise reduction circuit may be performed or the reduction level may be set moderate as compared with the case of "the moving image."

In a case where the image signal $S_{po}$ is the image signal of the still image group, the noise reduction processing in the NR section 111 may be stopped or the reduction level may be set small, but when the image signal $S_{po}$ is the image signal of the still image group, as the noise of the image is not prominent as described above, the necessity of the noise reduction processing is smaller and the image quality decrease due to the noise reduction processing may be suppressed.

The aliasing prevention filter 108, the resample section 109, the enhance section 110, and the NR section 111 described above may be included in the image signal processing section.

The High Definition Multimedia Interface ("HDMI") transmission section 112 may output the image signal output from the NR section 111 to the output terminal 113 in a format conforming to HDMI. It should be noted that the HDMI transmission section 112 may insert the classification information indicating that the image signal is one of the four types of "the moving image," "the completely still image," "the first motion added still image," and "the second motion added still image" into a blanking period of the image signal.

In addition, the HDMI transmission section 112 may insert scan information into an AVI InfoFrame packet arranged in the blanking period of the image signal, for example, a data island section. Herein, in a case where the image signal is the image signal of the still image group, an unnecessary image does not appear on a rim of the image, and underscan may be specified. It should be noted that the underscan herein means that all the effective pixels are displayed while avoiding a situation where overscan is performed and an outer part of the image is not displayed. In contrast to this, in a case where the image signal is the image signal of "the moving image," an unnecessary image may appear on the rim of the image, and the overscan may be specified.

An operation of the image display apparatus 100 illustrated in FIG. 1 will be described. Based on the selection operation by the user, the image data read section 104 may read a predetermined image signal from the recording medium 120. In this case, when the user may select the outputting of the image signal of "the moving image," the corresponding image signal of the moving image (the image file) may be read from the recording medium 120. In addition, when the user may select the outputting of the image signal of "the completely still image," the corresponding image signal of the still image may be read from the recording medium 120. Finally, when the user may select the outputting of the image signal of "the first motion added still image" or "the second motion added still image," the image signal of the still image for obtaining the image signal of "the first motion added still image" or "the second motion added still image" may be read from the recording medium 120.

Regarding the image signal read in the image data read section 104, after being decoded in the data extension section 105, through the scaling section 106 and the effect section 107, the image signal $S_{po}$ of the processing target may be obtained. In this case, when the user may select the outputting of the image signal of "the moving image" or "the completely still image," the image signal (the image signal of the moving image or the still image) decoded in the data extension section 105 is not processed in the scaling section 106 and the effect section 107 but output from the effect section 107 as the image signal $S_{po}$.

In addition, when the user may select the outputting of the image signal of "the first motion added still image," the image signal (the image signal of the still image) decoded in the data extension section 105 may be supplied to the effect section 107 via the scaling section 106 and the generation processing for the image signal of "the first motion added still image" may be performed. That is, in the effect section 107, the extraction area corresponding, for example, to the display area, may be set on the high resolution still image for the panorama image, the extraction area may be moved in units of the integer pixel/frame, and the image signal corresponding to the extraction area in each frame may be extracted and output. As a result, the image signal of "the first motion added still image" may be obtained from the effect section 107 as the image signal $S_{po}$ of the processing target.

In addition, when the user may select the outputting of the image signal of "the second motion added still image," the image signal (the image signal of the still image) decoded in the data extension section 105 may be supplied to a series circuit of the scaling section 106 and the effect section 107 and the generation processing for the image signal of "the second motion added still image" may be performed. That is, in the scaling section 106, the image magnification or reduction processing (zoom processing) may be performed. In addition, in the effect section 107, a similar processing to the case of generating the above-mentioned image signal of "the first motion added still image" may be performed. As a result, the image signal of "the second motion added still image" may be obtained from the effect section 107 as the image signal $S_{po}$ of the processing target.

The image signal $S_{po}$ output from the effect section 107 may be supplied to the image signal processing section in the later stage and processed under the control of the control section 101 in accordance with the type of the image signal $S_{po}$. That is, the image signal $S_{po}$ output from the effect section 107 may be supplied to the aliasing prevention filter 108. In the aliasing prevention filter 108, in order to prevent the aliasing distortion due to the sampling, the band of the image signal $S_{po}$ may be limited.

In this case, when the image signal $S_{po}$ is the image signal of the image signal of "the moving image" and "the second motion added still image," the band of the image signal $S_{po}$ may be limited to ½ or smaller than the sampling frequency (refer to a curve "a" of FIG. 5). In contrast to this, in a case where the image signal $S_{po}$ is the image signal of the image signal of "the completely still image" and "the first motion added still image," the band may be set wider and the aliasing distortion is not prominent in the image, the band of the image signal $S_{po}$ may be limited to a frequency higher than ½ of the sampling frequency, and the resolution decrease due to the band limitation may be suppressed (refer to a curve "b" of FIG. 5).

The image signal output from the aliasing prevention filter 108 may be supplied to the resample section 109. In the resample section 109, the resample processing may be performed so that the number of pixels of the image signal is matched with the number of pixels of the display apparatus (display). The image signal output from the resample section 109 may be supplied to the enhance section 110. In the enhance section 110, the processing for enhancing the contour of the image may be performed on the image signal output from the resample section 109.

In this case, when the image signal $S_{po}$ is the image signal of the still image group, as the band is larger and the moving noise is smaller and the noise is not prominent, the high frequency band in a vicinity of fs/2 may be enhanced and the fineness may be increased without highlighting the noise (refer to a curve "a" of FIG. 6). In contrast to this, in a case where the image signal $S_{po}$ is the image signal of "the moving image," as the band is narrow and further the moving noise is prominent, the lower frequency band may be enhanced as compared with the case of the image signal of the still image group (refer to the curve "b" of FIG. 6).

The image signal output from the enhance section 110 may be supplied to the NR section 111. In the NR section 111, the processing for reducing the noise of the image signal may be performed. In this case, when the image signal $S_{po}$ is the image signal of the still image group, the necessity of noise reduction processing is smaller because the noise is not prominent, and in order to suppress the decrease in image quality due to the noise reduction processing, the noise reduction processing in the NR section 111 may be stopped, or the reduction level may be set smaller. In contrast to this, in a case where the image signal $S_{po}$ is the image signal of "the moving image," as the moving noise is large and the noise is prominent, the noise reduction processing in the NR section 111 may be utilized.

The image signal output from the NR section 111 may be supplied to the HDMI transmission section 112. In the HDMI transmission section 112, the image signal output from the NR section 111 may be set for each frame into a format conforming to HDMI and output to the output terminal 113. In this case, the classification information indicating that the image signal is one of the four types of "the moving image," "the completely still image," "the first motion added still image," and "the second motion added still image" may be inserted into the blanking period of the image signal. In addition, in this case, the scan information may be inserted into the blanking period of the image signal (the underscan in the case of the image signal of the still image group and the overscan in the case of the image signal of "the moving image").

It should be noted that the image signal in the format conforming to HDMI may be supplied, for example, via an HDMI cable, to a display or the like having an HDMI terminal.

Figure 7:
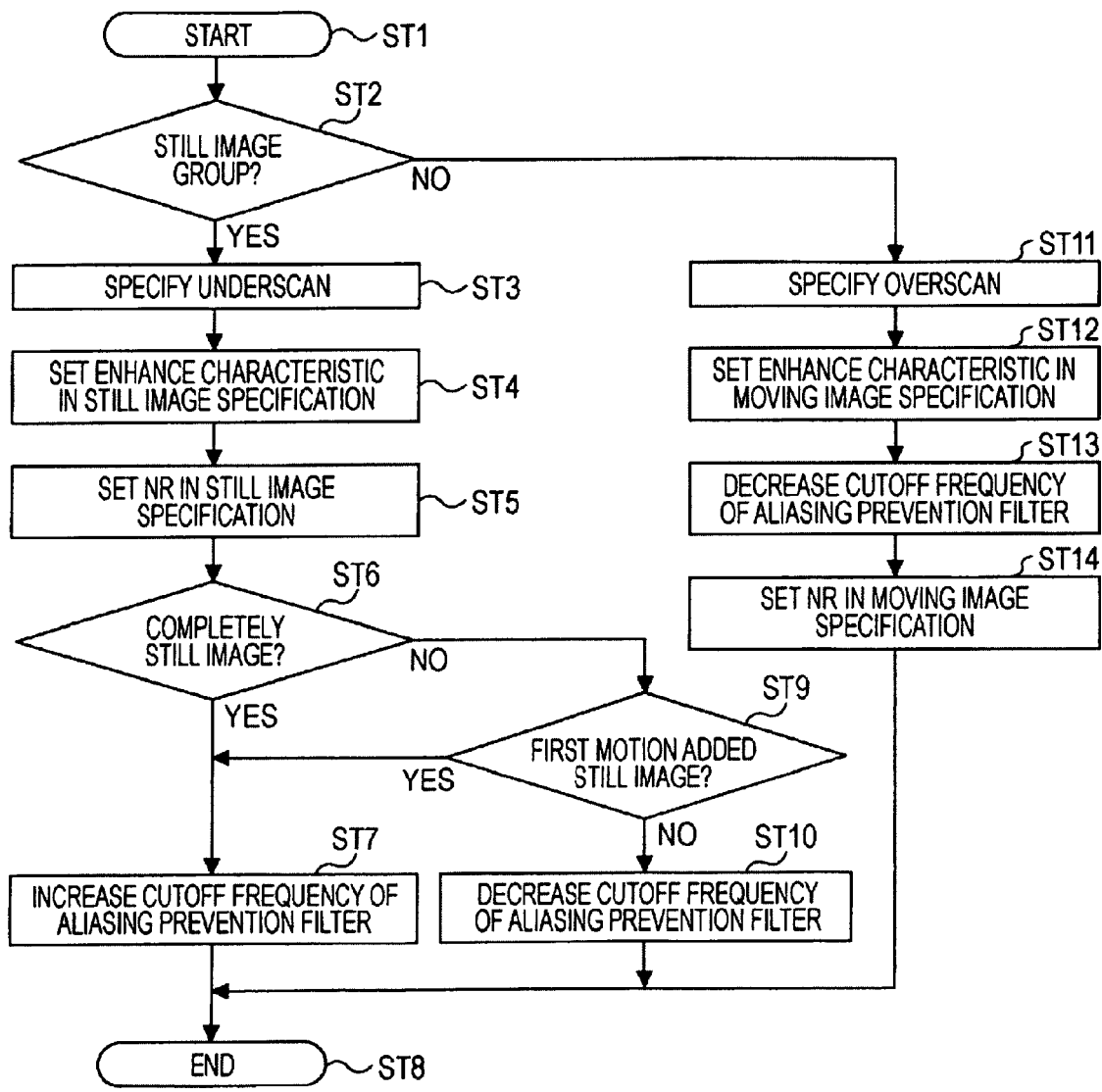
FIG. 7 is a flowchart of an example of a control operation of a control section in the image signal output apparatus.

A flowchart of FIG. 7 illustrates an example of the control operation of the control section 101 in the image display apparatus 100 of FIG. 1. The control section 101 may perform a control based on the classification information of the image signal $S_{po}$ obtained as described above.

The control section 101 may start the control processing in Step ST1, and thereafter, the flow may be shifted to Step ST2. In Step ST2, the control section 101 may determine whether the image signal $S_{po}$ is the image signal of the still image group ("the completely still image," "the first motion added still image," or "the second motion added still image"). When the signal is the image signal of the still image group, the control section 101 may specify the underscan in Step ST3. That is, the control section 101 may control the HDMI transmission section 112 to set the scan information inserted into the blanking period of the image signal as the underscan. This is because, in a case where the image signal $S_{po}$ is the image signal of the still image group, an unnecessary image does not appear at the rim of the image.

Next, the control section 101 may set the enhance characteristic in the still image specification in Step ST4. That is, the control section 101 may control the enhance section 110 to set the enhance characteristic as a characteristic in which the high frequency band in a vicinity of fs/2 may be enhanced (refer to the curve "a" of FIG. 6). This is because, as described above, in a case where the image signal $S_{po}$ is the image signal of the still image group, the band is larger, the moving noise is smaller, and the noise is not prominent, and therefore by enhancing the high frequency band in a vicinity of fs/2, the fineness may be increased without causing the noise to be more prominent.

Next, the control section 101 may set the operation of the NR section 111 in the still image specification in Step ST5. That is, the control section 101 may control the NR section 111 to stop the noise reduction processing or set the reduction level small. This is because, as described above, in a case where the image signal $S_{po}$ is the image signal of the still image group, the noise is not prominent, the necessity of the noise reduction processing is small, and the decrease in image quality due to the noise reduction processing may be suppressed.

Next, the control section 101 may determine, in Step ST6, whether the image signal $S_{po}$ is the image signal of "the completely still image." When the signal is the image signal of "the completely still image," the control section 101 may increase the cutoff frequency of the aliasing prevention filter 108 in Step ST7. That is, the control section 101 may control the aliasing prevention filter 108 to set the cutoff frequency as a frequency higher than ½ of the sampling frequency (refer to the curve "b" of FIG. 5). This is because, as described above, in a case where the image signal $S_{po}$ is the image signal of "the completely still image," the band is wide, the aliasing distortion is not prominent in the image, and the decrease in resolution due to the band limitation may be suppressed. After the processing in Step ST7, the control section 101 ends the control processing in Step ST8.

In addition, in Step ST6 described above, when the image signal $S_{po}$ is not the image signal of "the completely still image," the control section 101 may determine, in Step ST9, whether the image signal $S_{po}$ is the image signal of "the first motion added still image." When the signal is the image signal of "the first motion added still image," the control section 101 may increase the cutoff frequency of the aliasing prevention filter 108 in Step ST7 similarly to the above-mentioned case of the image signal of "the completely still image." This is because, as described above, in a case where the image signal $S_{po}$ is the image signal of "the first motion added still image," similarly to the case of the image signal of "the completely still image," the band is wide, the aliasing distortion is not prominent in the image, and the decrease in resolution due to the band limitation may be suppressed.

In addition, in Step ST9 described above, when the image signal $S_{po}$ is not the image signal of "the first motion added still image," in other words, when the image signal $S_{po}$ is the image signal of "the second motion added still image," the control section 101 may decrease the cutoff frequency of the aliasing prevention filter 108 in Step ST10. That is, the control section 101 may control the aliasing prevention filter 108 to set the cutoff frequency as a frequency which is ½ of the sampling frequency (refer to the curve "a" of FIG. 5). This is because, as described above, in a case where the image signal $S_{po}$ is the image signal of "the second motion added still image," the aliasing distortion is prominent, and the generation of the aliasing distortion may be prevented. After the processing in Step ST10, the control section 101 ends the control processing in Step ST8.

In addition, in Step ST2 described above, when the image signal $S_{po}$ is not the image signal of the still image group, in other words, when the image signal $S_{po}$ is the image signal of "the moving image," the control section 101 may specify the overscan in Step ST11. That is, the control section 101 may control the HDMI transmission section 112 to set the scan information inserted into the blanking period of the image signal as the overscan. This is because, in a case where the image signal $S_{po}$ is the image signal of "the moving image," an unnecessary image may appear in the rim of the image in some cases.

Next, the control section 101 may set the enhance characteristic in the moving image specification in Step ST12. That is, the control section 101 may control the enhance section 110 to set the enhance characteristic as a characteristic in which a frequency band lower than the high frequency band in a vicinity of fs/2 may be enhanced (refer to a curve "b" of FIG. 6). This is because, as described above, in a case where the image signal $S_{po}$ is the image signal of "the moving image," the moving noise is large and the noise is prominent, and the image quality degradation through the noise enhancement may be prevented.

Next, the control section 101 may decrease the cutoff frequency of the aliasing prevention filter 108 in Step ST13. That is, the control section 101 may control the aliasing prevention filter 108 to set the cutoff frequency as a frequency which is ½ of the sampling frequency (refer to the curve "a" of FIG. 5). This is because, as described above, in a case where the image signal $S_{po}$ is the image signal of "the moving image," the aliasing distortion is prominent, and the generation of the aliasing distortion may be prevented.

Next, the control section 101 may set the operation of the NR section 111 in the moving image specification in Step ST14. That is, the control section 101 may control the NR section 111 and the noise reduction processing may be set to be utilized. This is because, as described above, in a case where the image signal $S_{po}$ is the image signal of "the moving image," the moving noise is large and the noise is prominent, and the noise may be reduced in a preferred manner. After the processing in Step ST14, the control section 101 ends the control processing in Step ST8.

As described above, in the image display apparatus 100 illustrated in FIG. 1, based on the classification information of the image signal $S_{po}$, under the control of the control section 101, the processings of the aliasing prevention filter 108, the enhance section 110, and the NR section 111 may be controlled, and irrespective of the type of the image signal $S_{po}$, the processings may be performed so as to obtain the optimal image quality all the time.

In addition, in the image display apparatus 100 illustrated in FIG. 1, the processing may be performed while the image signal $S_{po}$ is classified into the four types including "the moving image," "the completely still image," "the first motion added still image," and "the second motion added still image." Even in a case where the image signal $S_{po}$ is the image signal of "the first motion added still image" or the image signal of "the second motion added still image," in the aliasing prevention filter 108, the enhance section 110, and the NR section 111, the processings may be performed so as to obtain the optimal image quality all the time.

It should be noted that the image display apparatus 100 illustrated in FIG. 1 may be configured as a personal computer as described above, and also configured as a photo player or a photo storing unit, and may be further included in an image display apparatus such as a camera apparatus or a television receiver. In addition, such a configuration has been described in the image display apparatus 100 illustrated in FIG. 1 that the image signal output from the NR section 111 may be output to the output terminal 113 in the format conforming to HDMI in the HDMI transmission section 112, but such a configuration may also be conceivable that the image signal output from the NR section 111 may be supplied to a display configured of an LCD for performing an image display.

Figure 8:
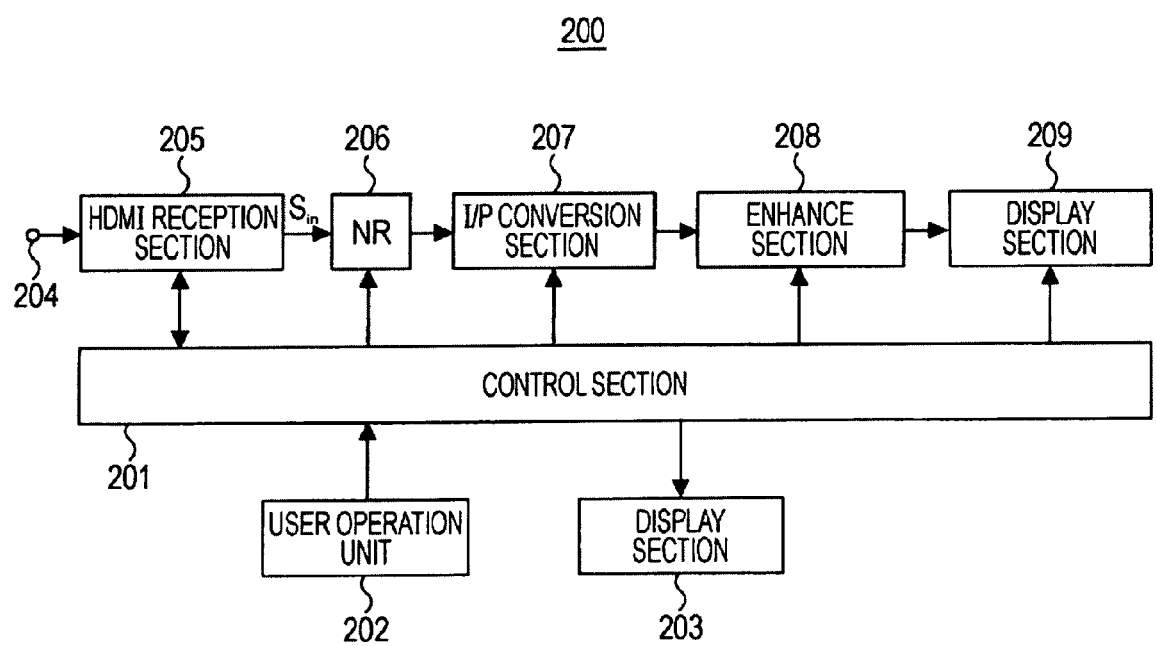
FIG. 8 is a block diagram of a configuration example of an image display apparatus.

FIG. 8 illustrates a configuration example of an image display apparatus 200. In the image display apparatus 200, with respect to the above-mentioned four types of the image signals including "the moving image," "the completely still image," "the first motion added still image," and "the second motion added still image," respectively, the processings may be performed so as to obtain the optimal image quality.

The image display apparatus 200 may include a control section 201, a user operation unit 202, a display section 203, an input terminal (HDMI terminal) 204, an HDMI reception section 205, an NR section 206, an I/P conversion section 207, an enhance section 208, and a display section 209.

The control section 201 may control an operation of the respective sections in the image display apparatus 200. The user operation unit 202 and the display section 203 may be included in the user interface, and may be connected to the control section 201. The user operation unit 202 may be configured of a key or a button arranged in a casing which is not shown of the image display apparatus 200, or a remote control apparatus. The display section 203 may be configured as a display element such as an LCD arranged in the casing which is not shown of the image display apparatus 200.

The HDMI reception section 205 may obtain the image signal $S_{in}$ of the processing target on the basis of the image signal in the format conforming to the HDMI which may be input to the input terminal 204, and also may obtain the classification information of the image signal $S_{in}$ inserted into the blanking period. Herein, the input terminal 204 and the HDMI reception section 205 respectively configure the image signal obtaining section and the classification information obtaining section. According to this embodiment, an image signal $S_{in}$ obtained in the HDMI reception section 205 may be an interlace signal.

In addition, according to this embodiment, the image signal $S_{in}$ may be an image signal of "the moving image," "the completely still image," "the first motion added still image," or "the second motion added still image," and the classification information may be information indicating which one of the image signals the image signal $S_{in}$ is. The classification information obtained in the HDMI reception section 205 may be supplied to the control section 201. An image signal processing section which will be described later may process the image signal $S_{in}$ output from the HDMI reception section 205 under the control of the control section 201 based on the classification information.

The NR section 206 may reduce the noise of the image signal $S_{in}$ output from the HDMI reception section 205. The NR section 206 may be configured of a three dimensional noise reduction circuit or a two dimensional noise reduction circuit known in the past. The NR section 206 may be controlled in the following manner under the control of the control section 201.

In a case where the NR section 206 is configured of the three dimensional noise reduction circuit, when the image signal $S_{in}$ is the image signal of "the moving image," as the noise of the image is prominent in each frame as described above, the noise reduction processing based on the three dimensional noise reduction circuit may be performed, but when the image signal $S_{in}$ is the image signal of the still image group, as the noise of the image is not prominent as described above, in order to prevent the decrease in the resolution, the noise reduction processing based on the three dimensional noise reduction circuit is not performed.

In addition, in a case where the NR section 206 is configured of the two dimensional noise reduction circuit, when the image signal $S_{in}$ is the image signal of "the moving image," as the noise of the image is prominent as described above, the noise reduction processing based on the two dimensional noise reduction circuit may be performed, but when the image signal $S_{in}$ is the image signal of the still image group, as the noise of the image is not prominent as described above, the noise reduction processing based on the two dimensional noise reduction circuit is not performed or the reduction level may be set moderate as compared with the case of "the moving image."

In this manner, in a case where the image signal $S_{in}$ is the image signal of the still image group, the noise reduction processing in the NR section 206 may be stopped or the reduction level may be set smaller, but when the image signal $S_{in}$ is the image signal of the still image group, as the noise of the image is not prominent as described above, the necessity of the noise reduction processing is smaller and a decrease in image quality due to the noise reduction processing may be suppressed.

The I/P conversion section 207 may convert the image signal output from the NR section 206 from the interlace signal to a progressive signal. Although a detail description is omitted, the I/P conversion section 207 may have a configuration of a motion adaptation type and line interpolation may be carried out on the moving image part, and field interpolation may be carried out on the still image part. The I/P conversion section 207 may be controlled in the following manner under the control of the control section 201.

That is, in a case where the image signal $S_{in}$ is the image signal of "the moving image" and "the second motion added still image," the I/P conversion section 207 may perform the motion adaptation interpolation processing. In contrast to this, in a case where the image signal $S_{in}$ is the image signal of "the completely still image" and "the first motion added still image," the I/P conversion section 207 may be forcibly instructed to perform the interpolation processing based on the field interpolation.

In this manner, in a case where the image signal $S_{in}$ is the image signal of the image signal of "the completely still image" and "the first motion added still image," in the I/P conversion section 207, forcibly, the interpolation processing based on the field interpolation may be performed, and the cause of the decrease in resolution due to the erroneous conduct of the line interpolation may be avoided.

The enhance section 208 may perform the processing for enhancing the contour of the image on the image signal output from the I/P conversion section 207. As described above, in the case of the image signal of "the moving image," the band is narrow and further the moving noise is larger and the noise is prominent, but in the case of the image signal of the still image group ("the completely still image," "the first motion added still image," or "the second motion added still image"), the band is larger, and further the moving noise is smaller and the noise is not prominent. For that reason, the enhance characteristic of the enhance section 208 may be controlled in the following manner under the control of the control section 201.

In a case where the image signal $S_{in}$ is the image signal of the still image group, the enhance characteristic of the enhance section 208 may enhance the high frequency band in a vicinity of fs/2 (refer to the curve "a" of FIG. 6). In addition, in a case where the image signal $S_{in}$ is the image signal of "the moving image," the enhance characteristic of the enhance section 208 may enhance a lower frequency band as compared with the case of the image signal of the still image group (refer to the curve "b" of FIG. 6).

In a case where the image signal $S_{in}$ is the image signal of the still image group, the enhance section 208 may enhance the high frequency band in a vicinity of fs/2, but as the band of the image signal is wider and the moving noise on the image based on the signal is smaller, the fineness may be increased without causing the noise to be more prominent.

The NR section 206, the I/P conversion section 207, and the enhance section 208 described above may be included in the image signal processing section.

The display section 209 may display an image based on the image signal output from the enhance section 208. The display section 209 may be configured, for example, as a fixed pixel display element such as an LCD or a PDP.

A description will be given of an operation of the image display apparatus 200 illustrated in FIG. 8.

The image signal in the format conforming to HDMI may be input to the input terminal 204, and this image signal may be supplied to the HDMI reception section 205. In the HDMI reception section 205, the image signal $S_{in}$ of the processing target may be obtained from the image signal in the format conforming to HDMI, and also the classification information of the image signal $S_{in}$ may be obtained. The classification information may be supplied to the control section 201.

The image signal $S_{in}$ may be supplied to the NR section 206. In the NR section 206, the processing for reducing the noise of the image signal may be performed. In this case, when the image signal $S_{in}$ is the image signal of the still image group, the necessity of the noise reduction processing is small because the noise is not prominent, and in order to suppress the decrease in image quality due to the noise reduction processing, the noise reduction processing in the NR section 206 may be stopped, or the reduction level may be set smaller. In contrast to this, in a case where the image signal $S_{in}$ is the image signal of "the moving image," as the moving noise is larger and the noise is prominent, the noise reduction processing the NR section 206 may be set to be utilized.

The image signal (the interlace signal) output from the NR section 206 may be supplied to the I/P conversion section 207. In the I/P conversion section 207, the image signal may be converted from the interlace signal to the progressive signal. In this case, when the image signal $S_{in}$ is the image signal of "the moving image" and "the second motion added still image," the motion adaptation interpolation processing may be carried out. In contrast to this, in a case where the image signal $S_{in}$ is the image signal of "the completely still image" and "the first motion added still image," forcibly, the interpolation processing based on the field interpolation may be performed so that the cause of the decrease in resolution can be avoided due to the erroneous conduct of the line interpolation.

The image signal (the progressive signal) output from the I/P conversion section 207 may be supplied to the enhance section 208. In the enhance section 208, the processing for enhancing the contour of the image may be performed on the image signal. In this case, when the image signal $S_{in}$ is the image signal of the still image group, as the band is larger, the moving noise is smaller, and the noise is not prominent, the high frequency band in a vicinity of fs/2 may be enhanced and the fineness may be increased without causing the noise to be more prominent (refer to the curve "a" of FIG. 6). In contrast to this, in a case where the image signal $S_{in}$ is the image signal of "the moving image," as the band is narrow and further the moving noise is prominent, the lower frequency band may be enhanced as compared with the case of the image signal of the still image group (refer to the curve "b" of FIG. 6).

The image signal output from the enhance section 208 may be supplied to the display section 209. An image based on the image signal may be displayed on the display section 209.

Figure 9:
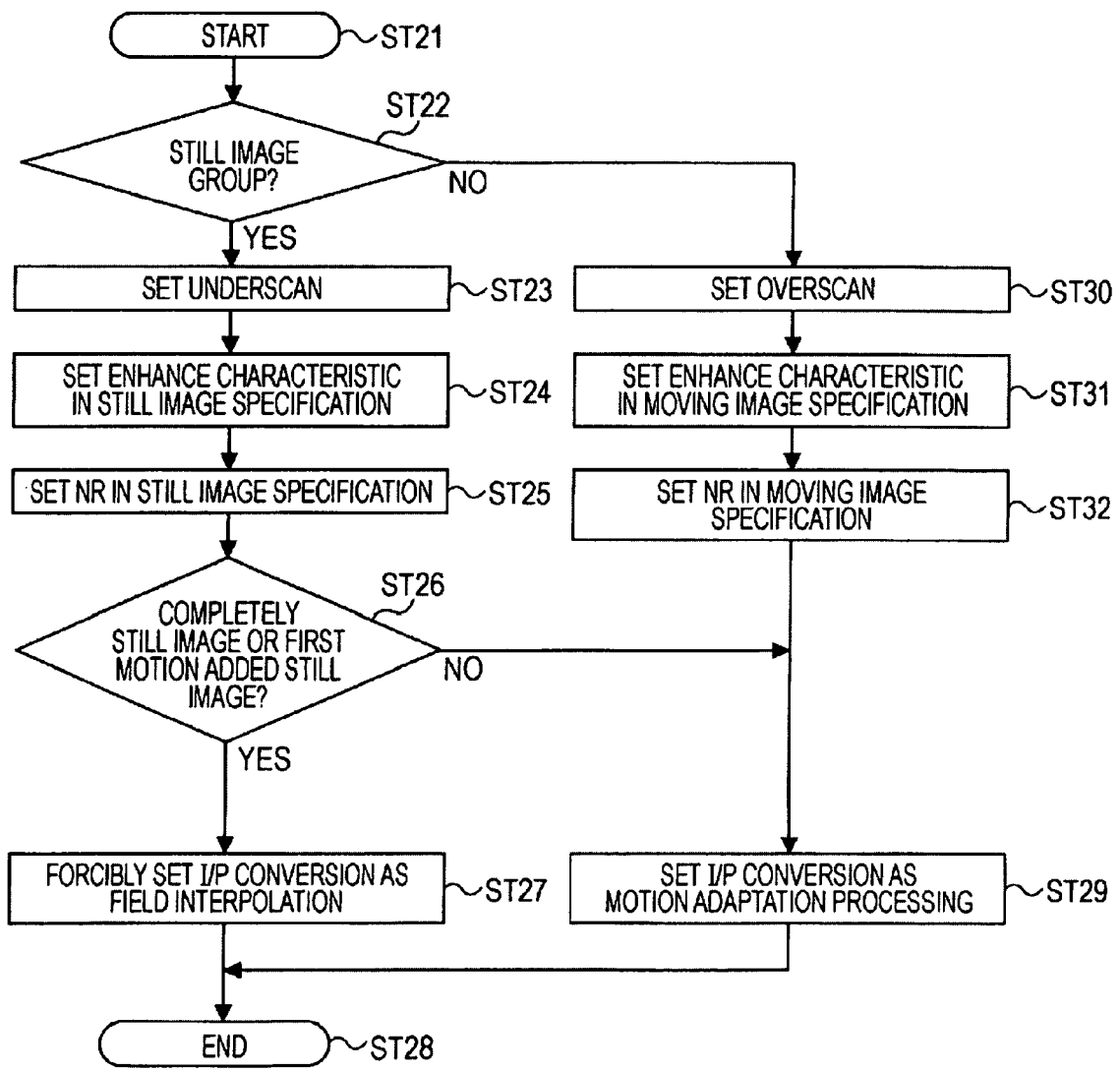
FIG. 9 is a flowchart of an example of a control operation of a control section in the image display apparatus.

A flowchart of FIG. 9 illustrates an example of a control operation of the control section 201 in the image display apparatus 200 of FIG. 8. The control section 201 may perform controlling based on the classification information of the image signal $S_{in}$ supplied from the HDMI reception section 205 as described above.

The control section 201 may start the control processing in Step ST21, and thereafter, the flow may be shifted to Step ST22. In Step ST22, the control section 201 may determine whether the image signal $S_{in}$ is the image signal of the still image group ("the completely still image," "the first motion added still image," or "the second motion added still image"). When the signal is the image signal of the still image group, the control section 201 may set the display in the display section 209 as the underscan in Step ST23.

Next, the control section 201 may set the enhance characteristic in the still image specification in Step ST24. That is, the control section 201 may control the enhance section 208 to set the enhance characteristic as a characteristic in which the high frequency band in a vicinity of fs/2 may be enhanced (refer to the curve "a" of FIG. 6). This is because, as described above, in a case where the image signal $S_{in}$ is the image signal of the still image group, the band is larger, the moving noise is smaller, and the noise is not prominent, and therefore by enhancing the high frequency band in a vicinity of fs/2, the fineness may be increased without causing the noise to be more prominent.

Next, the control section 201 may set the operation of the NR section 206 in the still image specification in Step ST25. That is, the control section 201 may control the NR section 206 to stop the noise reduction processing or set the reduction level smaller. This is because, as described above, in a case where the image signal $S_{in}$ is the image signal of the still image group, the noise is not prominent, the necessity of the noise reduction processing is smaller, and the decrease in image quality due to the noise reduction processing may be suppressed.

Next, the control section 201 may determine whether the image signal $S_{in}$ is the image signal of "the completely still image" or "the first motion added still image" in Step ST26. When the signal is the image signal of "the completely still image" or "the first motion added still image," the control section 201 may forcibly set the interpolation processing of the I/P conversion section 207 as the field interpolation in Step ST27. Therefore, the decrease in resolution due to the erroneous conduct of the line interpolation may be avoided. After the processing in Step ST27, the control section 201 ends the control processing in Step ST28.

In addition, in Step ST26 described above, when the signal is not the image signal of "the completely still image" or "the first motion added still image," in other words, when the signal is the image signal of "the second motion added still image," the control section 201 may set the interpolation processing of the I/P conversion section 207 as the motion adaptation in Step ST29, and thereafter, in Step ST28, the control processing may end.

In addition, in Step ST22 described above, when the signal is not the image signal of the still image group, in other words, when the signal is the image signal of "the moving image," the control section 201 may set the display in the display section 209 as the overscan in Step ST30. Then, the control section 201 may set the enhance characteristic as the moving image specification in Step ST31. That is, the control section 201 may control the enhance section 208 to set the enhance characteristic as a characteristic in which a frequency band lower than the high frequency band in a vicinity of fs/2 may be enhanced (refer to the curve "b" of FIG. 6). This is because, as described above, in a case where the image signal $S_{in}$ is the image signal of "the moving image," the moving noise is larger and the noise is prominent, and the image quality degradation through the noise enhancement may be prevented.

Next, the control section 201 may set the operation of the NR section 206 as the moving image specification in Step ST32. That is, the control section 201 may control the NR section 206 to utilize the noise reduction processing. This is because, as described above, in a case where the image signal $S_{in}$ is the image signal of "the moving image," the moving noise is larger and the noise is prominent, and the noise may be reduced in a preferred manner.

Then, after the processing in Step ST32, the control section 201 may set the interpolation processing of the I/P conversion section 207 as the motion adaptation in Step ST29, and thereafter, in Step ST28, the control processing may end.

As described above, in the image display apparatus 200 illustrated in FIG. 8, based on the classification information of the image signal $S_{in}$, under the control of the control section 201, the processings of the NR section 206, the I/P conversion section 207, and the enhance section 208 may be controlled, and irrespective of the type of the image signal $S_{in}$, an image with the optimal image quality may be displayed on the display section 209 all the time.

It should be noted that the control operation of the control section 201 illustrated in the flowchart of FIG. 9 may have a supposition that the classification information of the image signal $S_{in}$ is transmitted on the transmission side of the image signal $S_{in}$. However, the standard of the HDMI does not define the classification information at this current time. However, as a flag of the overscan is defined, by transmitting the flag of the overscan only to the moving image on the transmission side of the image signal, the control section 201 may perform a determination whether the signal is the still image group or not by using the flag of the overscan.

Figure 10:
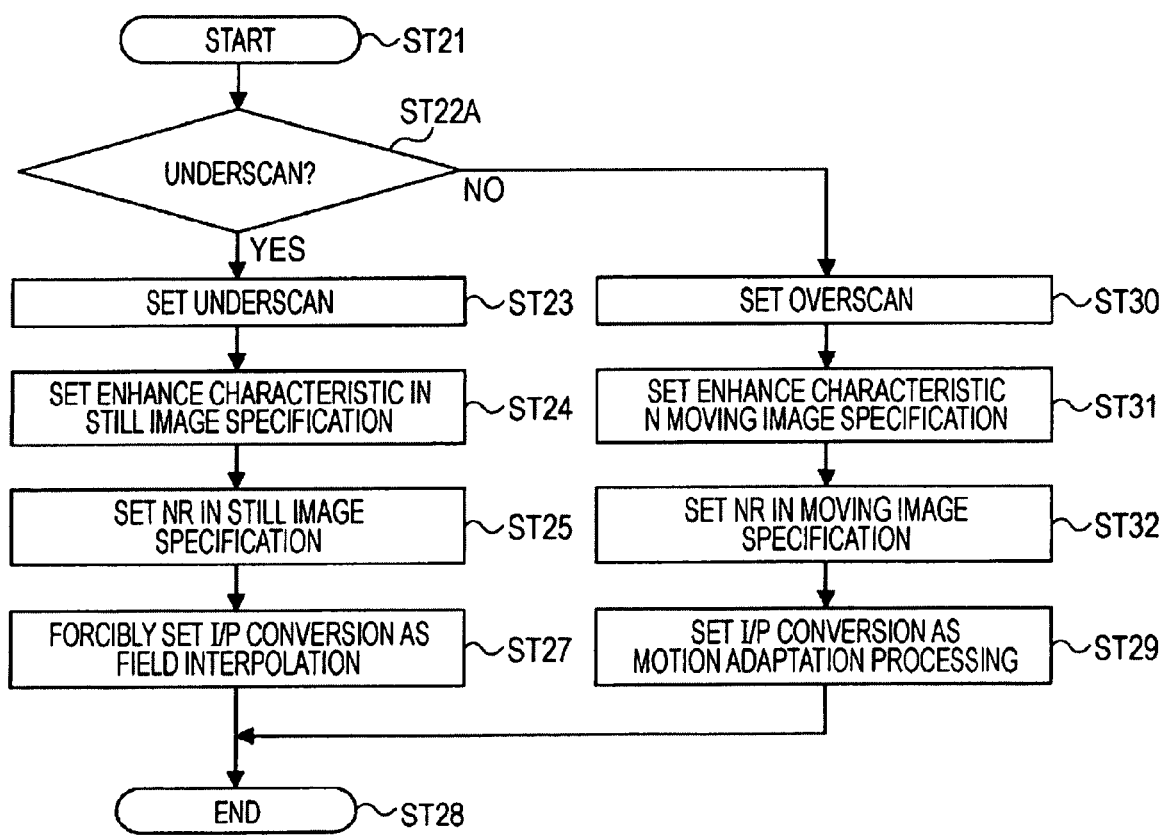
FIG. 10 is a flowchart of another example of a control operation of a control section in the image display apparatus.

A flowchart of FIG. 10 illustrates an example of the control operation of the control section 201 in which the flag of the overscan is used. In FIG. 10, steps corresponding to those in FIG. 9 are allocated with the same reference numerals.

The control section 201 may start the control processing in Step ST21, and thereafter, the flow may be shifted to Step ST22A. In Step ST22A, the control section 201 may determine whether this is the underscan or not. In this case, the control section 201 determines as the underscan when there is no flag of the overscan.

When the underscan is determined, as the image signal $S_{in}$ is the image signal of the still image group, the control section 201 may set the display in the display section 209 as the underscan in Step ST23, and thereafter, the flow may be shifted to Step ST24. On the other hand, when the overscan is determined, as the image signal $S_{in}$ is the image signal of the moving image, the control section 201 may set the display in the display section 209 as the overscan in Step ST30, and thereafter, the flow may be shifted to Step ST31.

As described above, when the underscan is determined, it is found out that the image signal $S_{in}$ is the image signal of the still image group, but it is not found out which one of "the completely still image," "the first motion added still image," and "the second motion added still image" the image signal actually is. Therefore, according to the control operation illustrated in the flowchart of FIG. 10, after the processing in Step ST25, the control section 201 may shift the flow to Step ST27.

Although a detail description is omitted, other parts of the flowchart of FIG. 10 are similar to those in the flowchart of FIG. 9.

In addition, in the image display apparatus 200 illustrated in FIG. 8, the processing may be performed while the image signal $S_{in}$ is classified into the four types including "the moving image," "the completely still image," "the first motion added still image" and "the second motion added still image." Even in a case where the image signal $S_{in}$ is the image signal of "the first motion added still image" or the image signal of "the second motion added still image," in the NR section 206, the I/P conversion section 207, and the enhance section 208, the processings may be performed so as to obtain the optimal image quality.

It should be noted that in the image display apparatus 200 illustrated in FIG. 8, the HDMI reception section 205 may obtain information whether the processings that should be processed in the NR section 206 and the enhance section 208 are already performed on the image signal $S_{in}$ as described above, for example, from the blanking period of the image signal, and the control section 201 may control the operations of the NR section 206 and the enhance section 208 based on the information so that the redundant processings are not performed on the image signal $S_{in}$.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable storage media, such as secondary storage devices, for example, hard disks, floppy disks, CD-ROMs, or other forms of RAM or ROM.

It is to be further appreciated that one skilled in the art will realize that the processes illustrated in this description may be implemented in a variety of ways and may include multiple other modules, programs, applications, scripts, processes, threads, or code sections that may all functionally interrelate with each other to accomplish the individual tasks described above. Such modules, programs, applications, scripts, processes, threads, or code sections based on the written description and methods of this invention are within the skill of an experienced developer. The various modules, programs, applications, scripts, processes, threads, or code sections can be created using any of the techniques known to one skilled in the art or can be designed in connection with existing software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. An image signal processing apparatus comprising:
   an image signal obtaining section configured to obtain an image signal to be processed;
   a classification information obtaining section configured to obtain classification information indicating the image signal as one of a plurality of image signal types, the plurality of image signal types including:
      a first type comprising a plurality of frames extracted from a still image, the frames being extracted by moving an extracting area in units of an integer pixel per frame over the still image, extracting the frames corresponding to the extraction area, and outputting an image signal corresponding to the frames;
      a second type of image signal indicating an image signal generated by performing image magnification or reduction processing on a still image to derive image data which has been scaled from the still image,
      the third type of image signal indicating a motion image signal captured as a video signal, and
      the forth type of image signal indicating a still image signal; and
   an image signal processing section configured to process the image signal based on the classification information;
   wherein the image signal is processed using a wider frequency band when the image signal is the first type of image signal or fourth type of image signal, or processed using a narrower frequency band when the image signal is the second type of image signal, or the third type of image signal.

2. The image signal processing apparatus according to claim 1, wherein:
   the image signal processing section includes an aliasing prevention filter configured to prevent aliasing distortion by setting a frequency band of the aliasing prevention filter higher than ½ of a sampling frequency of a display apparatus when the classification information indicates that the image signal is the first type of image signal or the forth type of image signal.

3. The image signal processing apparatus according to claim 1, wherein:
   the image signal processing section includes an enhance section configured to enhance a contour by applying a high frequency band in a vicinity of ½ of a sampling frequency of a display apparatus when the classification information indicates that the image signal is the first type of image signal.

4. The image signal processing apparatus according to claim 1, wherein:
   the image signal processing section includes a noise reduction section configured to reduce noise in an image signal; and
   noise reduction processing in the noise reduction section is stopped or a noise reduction level is set to a lower amount when the classification information indicates that the image signal is an image signal type other than the third type.

5. The image signal processing apparatus according to claim 1, wherein:
   the image signal obtained in said image signal obtaining section is an interlace image signal;
   the image signal processing section includes a motion adaptation I/P conversion section configured to convert the interlace image signal into a progressive image signal; and
   an interpolation in the motion adaptation I/P conversion section is processed as a field interpolation when the classification information indicates that the image signal is the first type of image signal.

6. The image signal processing apparatus according to claim 1, further comprising an image signal output section configured to output the image signal processed in the image signal processing section.

7. The image signal processing apparatus according to claim 1, further comprising an image display section configured to display an image based on the image signal processed in the image signal processing section.

8. The image signal processing apparatus according to claim 1, wherein the image signal obtaining section includes:
   an image data read section configured to read an image signal of a motion image or a still image from a recording medium; and
   an image signal generation section configured to generate the second type of image signal based on the still image read in the image data read section.

9. An image signal processing method comprising:
obtaining an image signal to be processed;
obtaining classification information indicating the image signal as one of a plurality of image signal types, the plurality of image signal types including;
   a first type comprising a plurality of frames extracted from a still image, the frames being extracted by moving an extracting area in units of an integer pixel per frame over the still image, extracting the frames corresponding to the extraction area, and outputting an image signal corresponding to the frames;
   a second type of image signal indicating an image signal generated by performing image magnification or reduction processing on a still image to derive image data which has been scaled from the still image,
   the third type of image signal indicating a motion image signal captured as a video signal, and
   the forth type of image signal indicating a still image signal; and
processing the image signal based on the classification information;
wherein the image signal is processed using a wider frequency band when the image signal is the first type of image signal or fourth type of image signal, or processed using a narrower frequency band when the image signal is the second type of image signal, or the third type of image signal.

10. A non-transitory computer-readable storage medium storing instructions for causing a computer to execute an image signal processing method, the method comprising:
obtaining an image signal to be processed;
obtaining classification information indicating the image signal as one of a plurality of image signal types, the plurality of image signal types including;
   a first type comprising a plurality of frames extracted from a still image, the frames being extracted by moving an extracting area in units of an integer pixel per frame over the still image, extracting the frames corresponding to the extraction area, and outputting an image signal corresponding to the frames;
   a second type of image signal indicating an image signal generated by performing image magnification or reduction processing on a still image to derive image data which has been scaled from the still image,
   the third type of image signal indicating a motion image signal captured as a video signal, and
   the forth type of image signal indicating a still image signal; and
processing the image signal based on the classification information;
wherein the image signal is processed using a wider frequency band when the image signal is the first type of image signal or fourth type of image signal, or processed using a narrower frequency band when the image signal is the second type of image signal, or the third type of image signal.

11. A camera apparatus comprising:
an image pickup section configured to pick up an image of a subject by capturing an image of the subject and output an image signal corresponding to the subject;
an image signal obtaining section adapted to obtain the image signal;
a classification information obtaining section configured to obtain classification information indicating the image signal as one of a plurality of image signal types, the plurality of image signal types including:
   a first type comprising a plurality of frames extracted from a still image, the frames being extracted by moving an extracting area in units of an integer pixel per frame over the still image, extracting the frames corresponding to the extraction area, and outputting an image signal corresponding to the frames;
   a second type of image signal indicating an image signal generated by performing image magnification or reduction processing on a still image to derive image data which has been scaled from the still image,
   the third type of image signal indicating a motion image signal captured as a video signal, and
   the forth type of image signal indicating a still image signal; and
an image signal processing section configured to process the image signal based on the classification information;
wherein the image signal is processed using a wider frequency band when the image signal is the first type of image signal or fourth type of image signal, or processed using a narrower frequency band when the image signal is the second type of image signal, or the third type of image signal.

* * * * *